Sept. 4, 1928.
V. HUGHES
METHOD OF MAKING DRAG LINKS
1,683,035
Filed Nov. 30, 1925
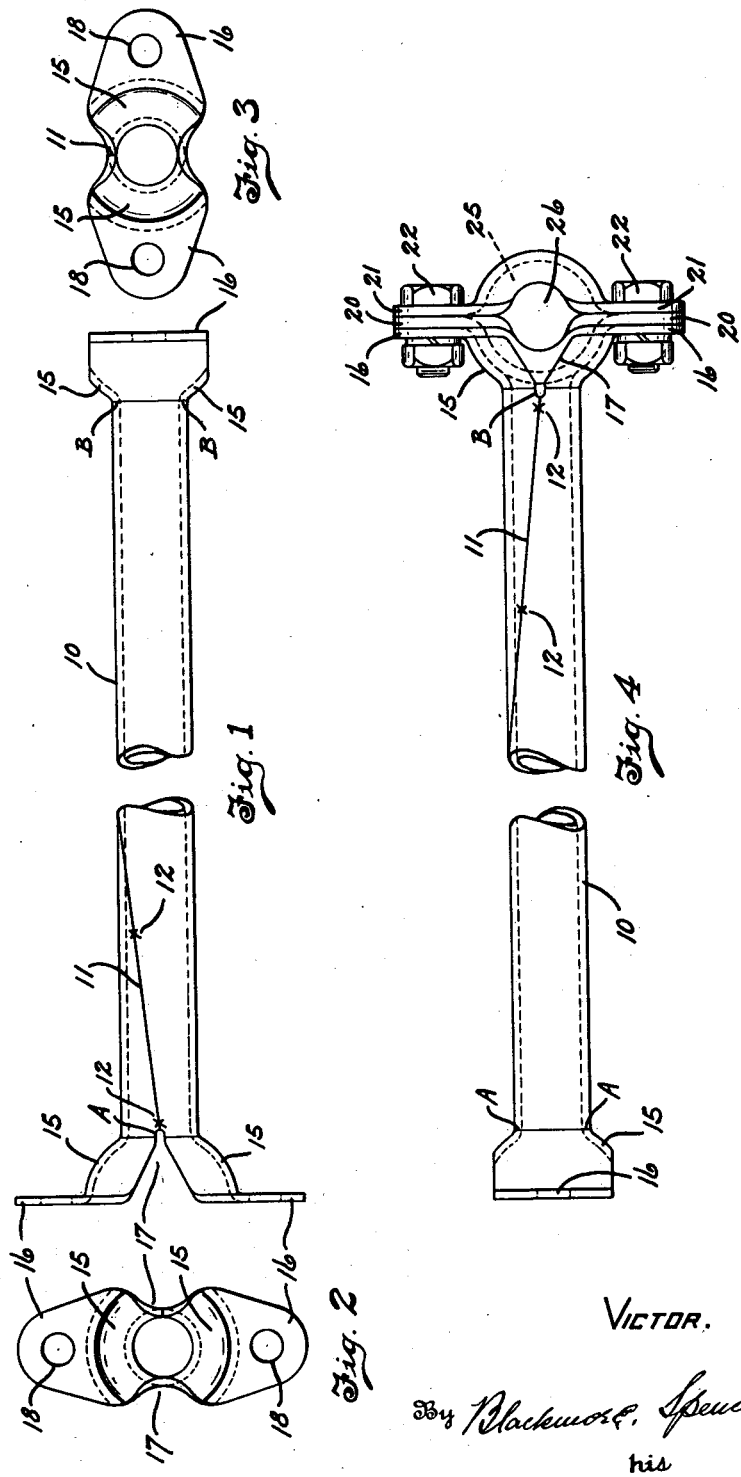
Inventor
VICTOR. HUGHES
By Blackmore, Spencer & Flint
his Attorneys.

Patented Sept. 4, 1928.

1,683,035

UNITED STATES PATENT OFFICE.

VICTOR HUGHES, OF DETROIT, MICHIGAN, ASSIGNOR TO GENERAL MOTORS RESEARCH CORPORATION, OF DETROIT, MICHIGAN, A CORPORATION OF DELAWARE.

METHOD OF MAKING DRAG LINKS.

Application filed November 30, 1925. Serial No. 72,380.

This invention relates to an improved form of drag link for the steering linkage of automotive vehicles.

An object of this invention is to provide a drag link having semi-spherical sockets at each end thereof formed integrally therewith from a single piece of flat metal stock.

Further objects, etc.

In the drawings:

Fig. 1 is a plan view of a drag link built according to this invention.

Fig. 2 is an end view showing the semi-spherical socket and bolt lugs thereon.

Fig. 3 is an end view of the opposite end of the drag link.

Fig. 4 is a side view of Fig. 1 but shows the two ball socket bearing members bolted in place forming a ball socket bearing upon the end of the drag link.

Similar reference characters refer to similar parts throughout the several views.

The tubular portion 10 of the drag link is rolled up from a piece of flat metal stock of such dimensions as to give the desired length and diameter of tube. The longitudinal seam 11 is given a helical pitch of one quarter turn from point A to point B so that the seams in the opposite ends of the tubular portion are at ninety degrees to each other. The tube is preferably strengthened by the spot welds 12 distributed along the seam 11 from point A to point B. The ends of the flat stock are preferably slotted along their center line before being rolled up into tubular form so that the tube will have diametrically opposed slots at both ends from the points A and B to the ends of the tube.

These slotted ends of the tube are then spread apart by means of suitable dies and the metal drawn out sufficiently to form the spherical portions 15 and the laterally extending bolt lugs 16. During this spreading and drawing operation the slots in the tube ends open up and form the V-shaped openings 17. Preferably the apex of these V-shaped openings is rounded somewhat as shown at point A in Fig. 1 and at point B in Fig. 4 in order to prevent the tendency of the metal to split back deeper during the spreading operation. The bolt holes 18 are preferably punched or drilled and the lugs 16 cut to a symmetrical form after the die-shaping operations.

At the right side of Fig. 4, the two pressed metal ball socket bearing members 20 and 21 are shown bolted in place upon the spherical socket 15 by means of the two bolts 22. The head of the ball (not shown) of the ball and socket joint fits snugly within the spherical space 25 formed between the two members 20 and 21 and the shank of the ball extends through the opening 25 clearly shown in Fig. 4. It is obvious that the V-shaped openings 17 provide the proper clearance between the spherical portion 15 and the shank of the ball.

Ordinarily in motor vehicle steering mechanism the two ball shanks at opposite ends of the drag link extend at ninety degrees to one another. This invention provides a drag link for such a case. Of course if the two ball shanks extend at a relative angle other than ninety degrees the longitudinal seam 11 in the tubular portion 10 will be given such a pitch that the bolt lugs 16 will extend at the proper angle to suit the relative directions of the ball shanks.

While the form of embodiment of the present invention as herein disclosed, constitutes a preferred form, it is to be understood that other forms might be adopted, all coming within the scope of the claims which follow.

I claim:

1. The method of forming a tubular drag link from an elongated piece of flat metal stock comprising rolling said flat stock into tubular form so that the longitudinal seam at one end of the tube lies at ninety degrees to the seam at the opposite end of the tube, and then deforming the metal at the ends of said tube to form enlarged socket portions with bolt lugs extending laterally therefrom.

2. The method of forming a tubular drag link from an elongated piece of flat metal stock comprising rolling said flat stock into tubular form so that the longitudinal seam at one end of the tube lies at ninety degrees to the seam at the opposite end of the tube, and then spreading each end of the tube at right angles to the seam and pressing the metal of the spread ends into substantially semi-spherical sockets with bolt lugs extending laterally therefrom.

In testimony whereof I affix my signature.

VICTOR HUGHES.